(12) United States Patent
Liu

(10) Patent No.: US 8,266,422 B2
(45) Date of Patent: Sep. 11, 2012

(54) NETWORK SECURITY PROCESSING METHOD AND SYSTEM FOR SELECTING ONE OF SOFTWARE AND HARDWARE CRYPTOGRAPHIC MODULES BY MEANS OF MULTIMEDIA SESSION INFORMATION

(75) Inventor: Hsueh-Teng Liu, Taipei (CN)

(73) Assignee: Panasonic Corporation, Osaka (JP)

( * ) Notice: Subject to any disclaimer, the term of this patent is extended or adjusted under 35 U.S.C. 154(b) by 871 days.

(21) Appl. No.: 12/375,772

(22) PCT Filed: Oct. 15, 2007

(86) PCT No.: PCT/JP2007/070500
§ 371 (c)(1), (2), (4) Date: Jan. 30, 2009

(87) PCT Pub. No.: WO2008/050697
PCT Pub. Date: May 2, 2008

(65) Prior Publication Data
US 2009/0327697 A1  Dec. 31, 2009

(30) Foreign Application Priority Data
Oct. 16, 2006  (CN) .......................... 2006 1 0135512

(51) Int. Cl.
*H04L 29/06* (2006.01)
*H04L 12/22* (2006.01)
(52) U.S. Cl. ..................................................... 713/151
(58) Field of Classification Search .................. 713/151, 713/168; 380/28
See application file for complete search history.

(56) References Cited

U.S. PATENT DOCUMENTS

| | | | |
|---|---|---|---|
| 7,529,200 B2 * | 5/2009 | Schmidt et al. | 370/260 |
| 2002/0078348 A1 * | 6/2002 | Leung et al. | 713/164 |
| 2006/0195527 A1 | 8/2006 | Allen et al. | |
| 2007/0079380 A1 | 4/2007 | Kawaguchi et al. | |
| 2007/0113095 A1 | 5/2007 | Marui et al. | |
| 2008/0098239 A1 | 4/2008 | Wada et al. | |
| 2008/0170686 A1 | 7/2008 | Nemoto et al. | |
| 2008/0172712 A1 | 7/2008 | Munetsugu | |

FOREIGN PATENT DOCUMENTS
JP  2003-69555  3/2003

OTHER PUBLICATIONS
English language Abstract of JP 2003-69555, Mar. 7, 2003.

* cited by examiner

*Primary Examiner* — Jeffrey Pwu
*Assistant Examiner* — Samuel Ambaye
(74) *Attorney, Agent, or Firm* — Greenblum & Bernstein, P.L.C.

(57) ABSTRACT

In a network security processing method and system for selecting one of software and hardware cryptographic modules by means of multimedia session information, the method includes the following steps: subjecting a plurality of packets of a multimedia session to signaling processing so as to obtain multimedia session information contained in the multimedia session, subjecting the multimedia session to a key authentication negotiation and according to the multimedia session information, making a determination to activate one of the software cryptographic module and the hardware cryptographic module. If the hardware cryptographic module is activated, the hardware cryptographic module performs network security processing of the packets of the multimedia session. If the software cryptographic module is activated, the software cryptographic module performs the network security processing of the packets of the multimedia session.

39 Claims, 13 Drawing Sheets

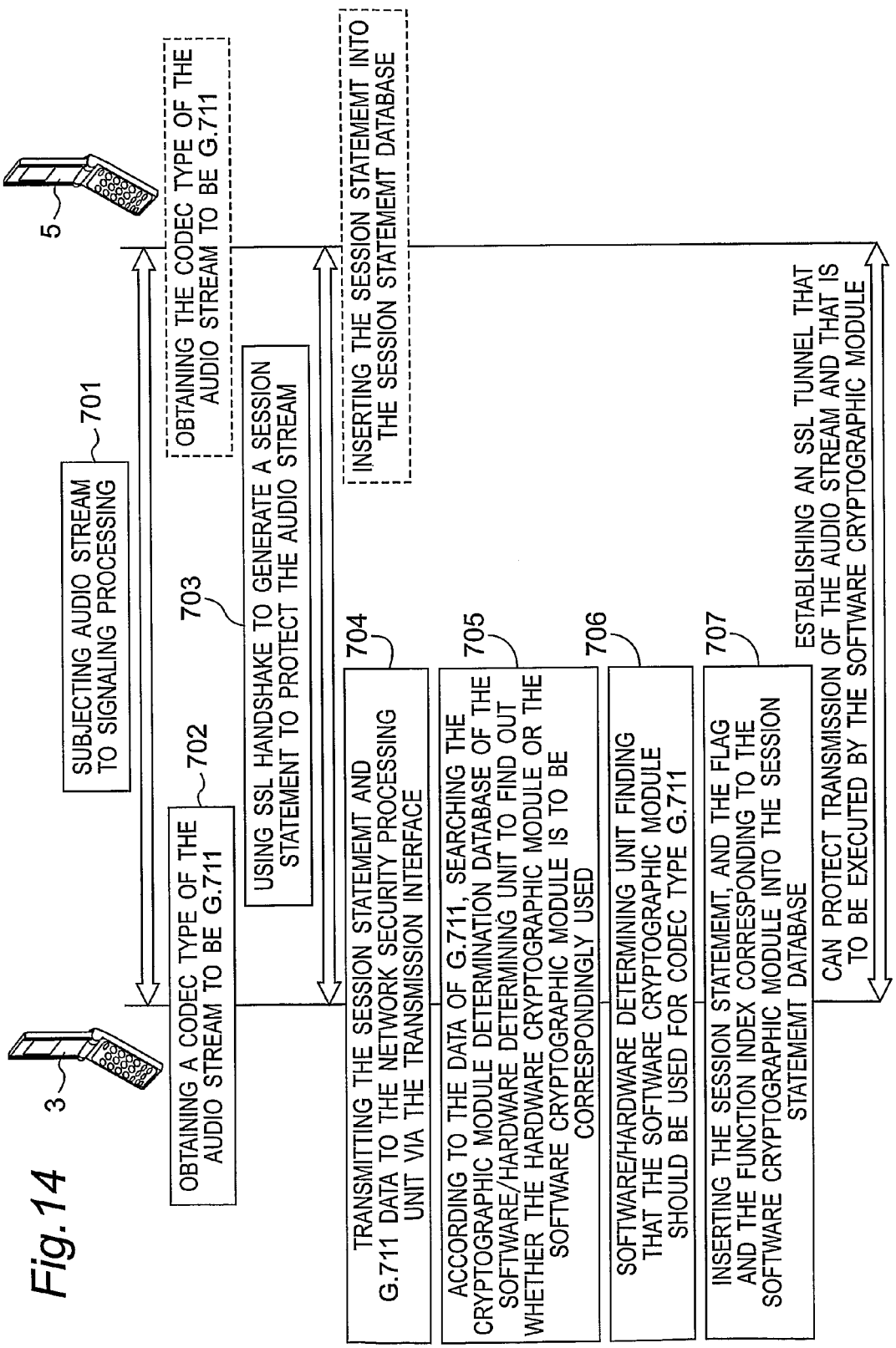

NETWORK SECURITY PROCESSING METHOD AND SYSTEM FOR SELECTING ONE OF SOFTWARE AND HARDWARE CRYPTOGRAPHIC MODULES BY MEANS OF MULTIMEDIA SESSION INFORMATION

TECHNICAL FIELD

The invention relates to a network security processing method and system, and more particularly to a network security processing method and system for selecting one of software and hardware cryptographic modules by means of multimedia session information.

BACKGROUND ART

There is a keen demand for delivery of encrypted images, video, and music media streams over the Internet on consumer electronics using high-performance Internet protocol security (IP security, IPSec). At present, a conventional way is to utilize an encryption/decryption accelerator or hardware to offload IPSec processing to enhance its overall performance.

However, a paper entitled "The Design of the OpenBSD Cryptographic Framework" in Usenix Annual Technical Conference published by Usenix in 2003 identified an issue associated with the use of encryption/decryption accelerator or hardware. The issue is that transmission of small packets takes up longer cryptographic processing time compared with those that do not use a hardware cryptographic accelerator, which is due to the overhead of operating system kernel (OS kernel), data bus, and cryptographic processing hardware. More specifically, the processing of a small packet and an ordinary-sized packet will both incur overhead but for small packets, the entire system needs to process more overhead within a time unit, and must therefore pay a higher price for processing the transmission of small packets. Under such circumstances, even if cryptographic processing hardware is used, its cryptographic processing time cannot be effectively reduced.

Japanese Patent Publication No. JP2003069555 for "Encryption Device and Encryption/Decryption Processing Method" described a method and device for addressing the aforesaid issue. The solution is to examine the length of each packet to determine whether cryptographic processing is to be performed by a hardware cryptographic module or a software cryptographic module. If it is a small packet, cryptographic processing is performed by the software cryptographic module. If it is a large packet, cryptographic processing is performed by the hardware cryptographic module.

However, a processing circuit for the aforesaid selective use of the software or hardware cryptographic module requires examination of every packet, and is therefore very inefficient in transmission of video and audio streams where transmission rate is of major concern. In addition, the processing circuit also passes the small packet unconditionally to the software cryptographic module for processing without considering the overhead of a central processing unit or the system, which will lead to a drop in the efficiency of the entire system. There is thus a need to find a solution.

DISCLOSURE OF INVENTION

Therefore, one object of the present invention is to provide a network security processing method for selecting one of software and hardware cryptographic modules by means of multimedia session information.

Accordingly, the network security processing method for selecting one of software and hardware cryptographic modules by means of multimedia session information of the present invention includes the following steps. Initially, a plurality of packets of a multimedia session are subjected to signaling processing to obtain multimedia session information contained in the multimedia session. Subsequently, the multimedia session is subjected to a key authentication negotiation. Next, according to the multimedia session information, a determination is made to activate one of the hardware cryptographic module and the software cryptographic module. If the hardware cryptographic module is activated, the hardware cryptographic module manages the network security processing of the packets of the multimedia session. If the software cryptographic module is activated, the software cryptographic module manages the network security processing of the packets of the multimedia session.

In addition, another object of the present invention is to provide a system for selecting one of software and hardware cryptographic modules by means of multimedia session information.

Accordingly, the system for selecting one of software and hardware cryptographic modules by means of multimedia session information of the present invention includes an information analyzing unit, a network security processing unit, and a software/hardware determining unit.

The information analyzing unit is used to perform signaling processing of a multimedia session so as to obtain multimedia session information therein. The network security processing unit is used to perform network security processing and includes a key authentication sub-unit for conducting a key authentication negotiation on the multimedia session, and a cryptographic processing sub-unit containing a hardware cryptographic module and a software cryptographic module. The software/hardware determining unit determines which one of the hardware cryptographic module and the software cryptographic module is to perform the network security processing based on the multimedia session information. The software/hardware determining unit includes a cryptographic module determining sub-unit that can select the use of the hardware cryptographic module or the software cryptographic module, and a cryptographic module determination database connected to the cryptographic module determining sub-unit.

The effect of this invention resides in that one of the hardware and software cryptographic modules can be selected appropriately to execute Internet security processing so as to provide the highest execution efficiency when applied to the transmission of encrypted video and audio.

BRIEF DESCRIPTION OF DRAWINGS

Other features and advantages of the present invention will become apparent in the following detailed description of the preferred embodiments with reference to the accompanying drawings, of which:

FIG. 14 is a schematic network communication diagram to illustrate a secure socket layer tunnel established between a first cell phone and a second cell phone according to the second preferred embodiment.

BEST MODE FOR CARRYING OUT THE INVENTION

Figure 1:
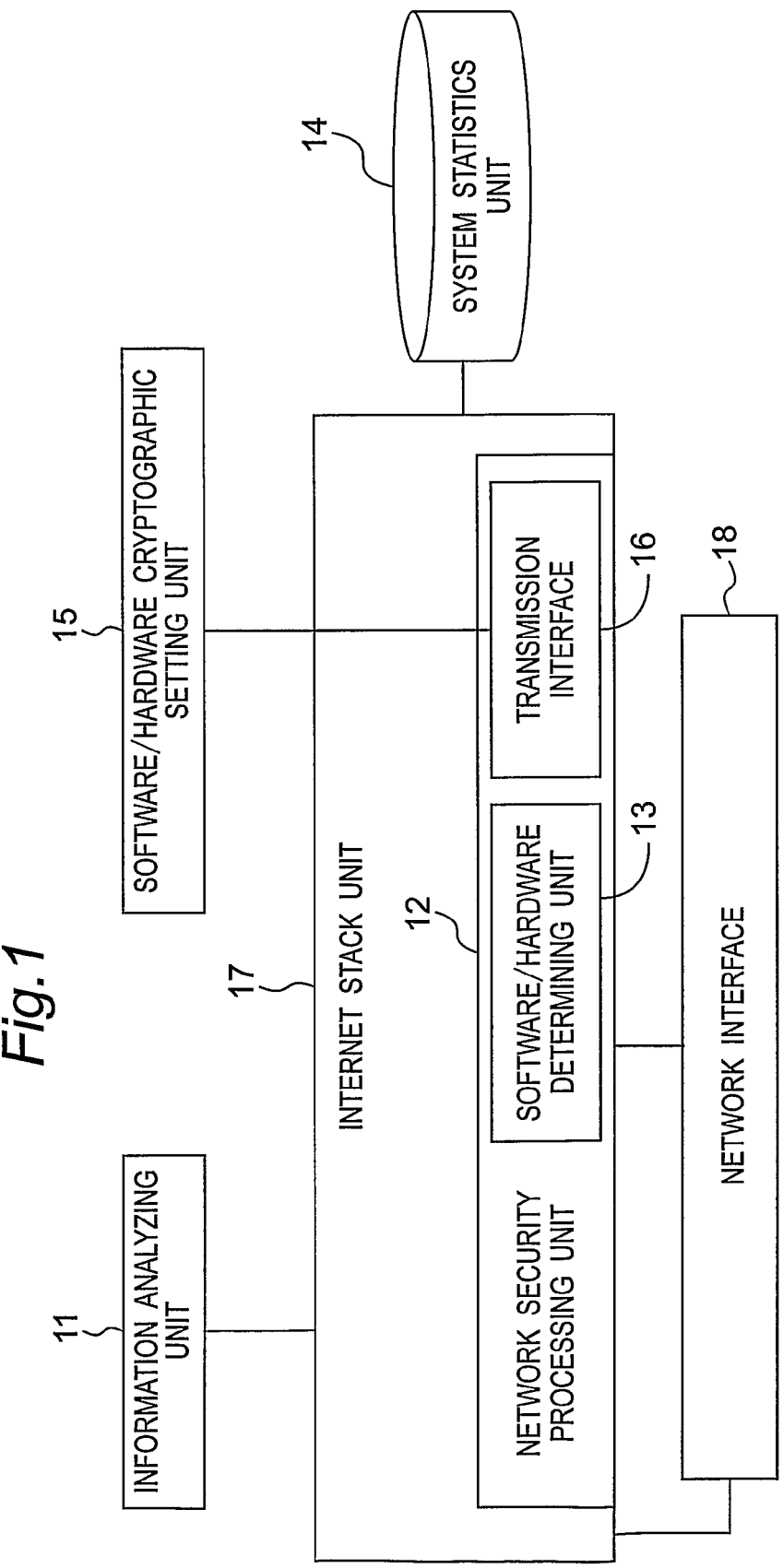
FIG. 1 is a system block diagram to illustrate the first preferred embodiment of a network security processing method and system for selecting one of software and hardware cryptographic modules by means of multimedia session information according to the present invention.

Before the present invention is described in greater detail, it should be noted that like elements are denoted by the same reference numerals throughout the disclosure.

Figure 2:
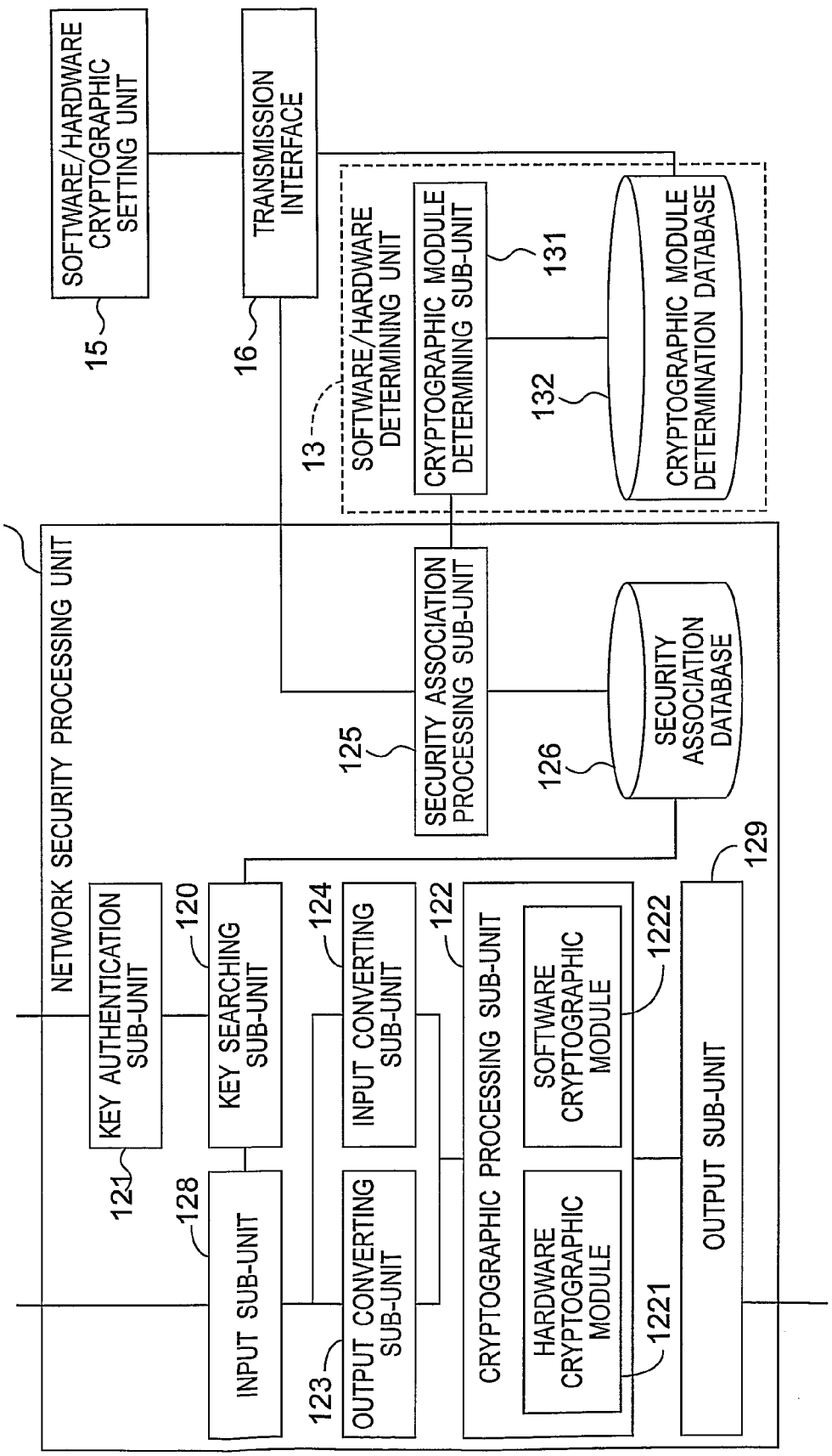
FIG. 2 is a function block diagram to illustrate a network security processing unit and a software/hardware determining unit of the first preferred embodiment.

Referring to FIGS. 1 and 2, the first preferred embodiment of a system for selecting one of software and hardware cryptographic modules by means of multimedia session information according to the present invention adopts IP Security (IPSec) as the standard for ensuring secure Internet information communication, and can be designed in multimedia equipment that needs to transmit multimedia content in an encrypted manner. The system includes an information analyzing unit 11, a network security processing unit 12, a software/hardware determining unit 13, a system statistics unit 14, a software/hardware cryptographic setting unit 15, a transmission interface 16, an Internet stack unit 17, and a network interface 18.

The information analyzing unit 11 is used to perform signaling processing of a multimedia session transmitted over the Internet so as to obtain associated multimedia session information containing a media type and a codec type therein. The media type refers to the format of the multimedia content, such as audio, video or voice. The codec type is the media encoding scheme of the multimedia content. For example, G.723, G.729, and G.711 are codec types used by voice over IP (VoIP). In addition, in the first preferred embodiment, the information analyzing unit 11 can be a session initiation protocol (SIP) processing unit or a real time streaming protocol (RSTP) processing unit.

Figure 3:
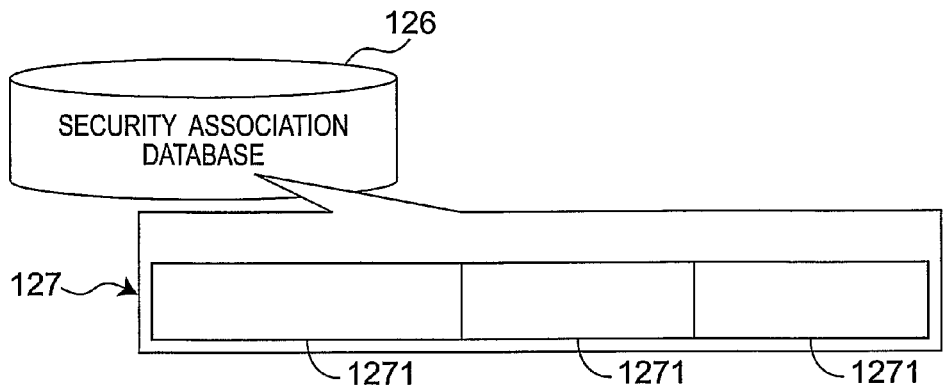
FIG. 3 is a schematic diagram to illustrate the contents of a security association database of the first preferred embodiment.

The network security processing unit 12 is used to perform network security processing. The network security processing unit 12 includes a key authentication sub-unit 121 for conducting a key authentication negotiation on the multimedia session, a cryptographic processing sub-unit 122 containing a hardware cryptographic module 1221 and a software cryptographic module 1222, a security association processing sub-unit 125, a security association database 126 connected to the security association processing sub-unit 125, an input sub-unit 128 connected to the Internet stack unit 17 and the network interface 18, an output sub-unit 129 connected to the Internet stack unit 17 and the network interface 18, an output converting sub-unit 123 connected to the input sub-unit 128, an input converting sub-unit 124 connected to the input sub-unit 128, and a key searching sub-unit 120. The cryptographic processing sub-unit 122 of the network security processing unit 12 uses IPSec to perform the network security processing. In addition, the key authentication sub-unit 121 of the network security processing unit 12 uses Internet key exchange to generate a security association. When the security association is generated at one of the communicating parties, the other party will search for a corresponding security association through the key searching sub-unit 120, which will serve as a basis for encryption and decryption on both sides. Referring to FIG. 3, the security association database 126 of the network security processing unit 12 has a plurality of key arrays 127. Each key array 127 has a plurality of information fields 1271.

Figure 4:
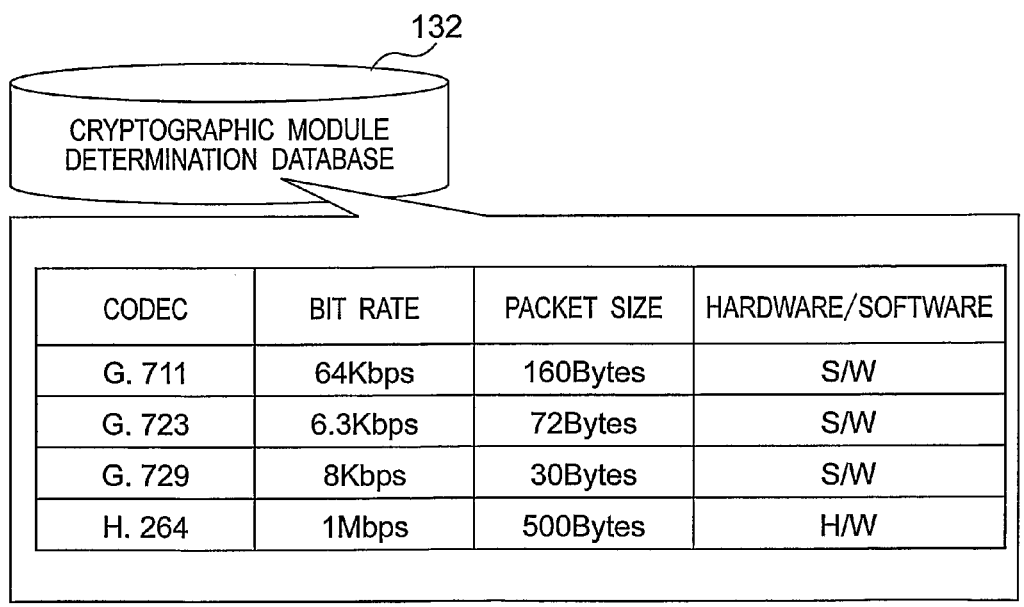
FIG. 4 is a schematic diagram to illustrate the contents of a cryptographic module determination database of the first preferred embodiment.

Referring to FIGS. 1 and 2, the software/hardware determining unit 13 determines which one of the hardware cryptographic module 1221 and the software cryptographic module 1222 is to perform the network security processing based on the multimedia session information. The software/hardware determining unit 13 includes a cryptographic module determining sub-unit 131 that can select the use of the hardware cryptographic module 1221 or the software cryptographic module 1222, and a cryptographic module determination database 132 connected to the cryptographic module determining sub-unit 131. Contents of data in the cryptographic module determination database 132 are shown in FIG. 4. When the software/hardware determining unit 13 determines the use of the hardware cryptographic module 1221, the security association processing sub-unit 125 records the security association and a flag and identification information corresponding to the hardware cryptographic module 1221 in the information fields 1271 of each matched key array 127 of the security association database 126. When the software/hardware determining unit 13 determines the use of the software cryptographic module 1222, the security association processing sub-unit 125 records the security association and a flag and a function index corresponding to the software cryptographic module 1222 in the information fields 1271 of each matched key array 127 of the security association database 126.

The system statistics unit 14 is used to record a system statistic value. The system statistic value can be a utilization rate of a central processing unit or a system load value. When the system statistic value is higher than a threshold value, the software/hardware determining unit 13 selects the hardware cryptographic module 1221 to perform network security processing with respect to the multimedia session. The purpose is to relieve the central processing unit of burden of additional encryption and decryption operations when overloaded.

The software/hardware cryptographic setting unit 15 is used to connect to the cryptographic module determination database 132 of the software/hardware determining unit 13, and to input into the cryptographic module determination database 132 a plurality of preset conditions for selecting the use of the hardware cryptographic module 1221 or the software cryptographic module 1222, so as to generate database contents showing the hardware cryptographic module 1221 or the software cryptographic module 1222 associated with the codec types, as shown in FIG. 4.

The transmission interface 16 is provided between the network layer and the application layer of the Internet, and is connected to the security association processing sub-unit 125 of the network security processing unit 12 and the cryptographic module determination database 132 of the software/hardware determining unit 13. The purpose is to communicate information between the network layer and the application layer.

Figure 5:
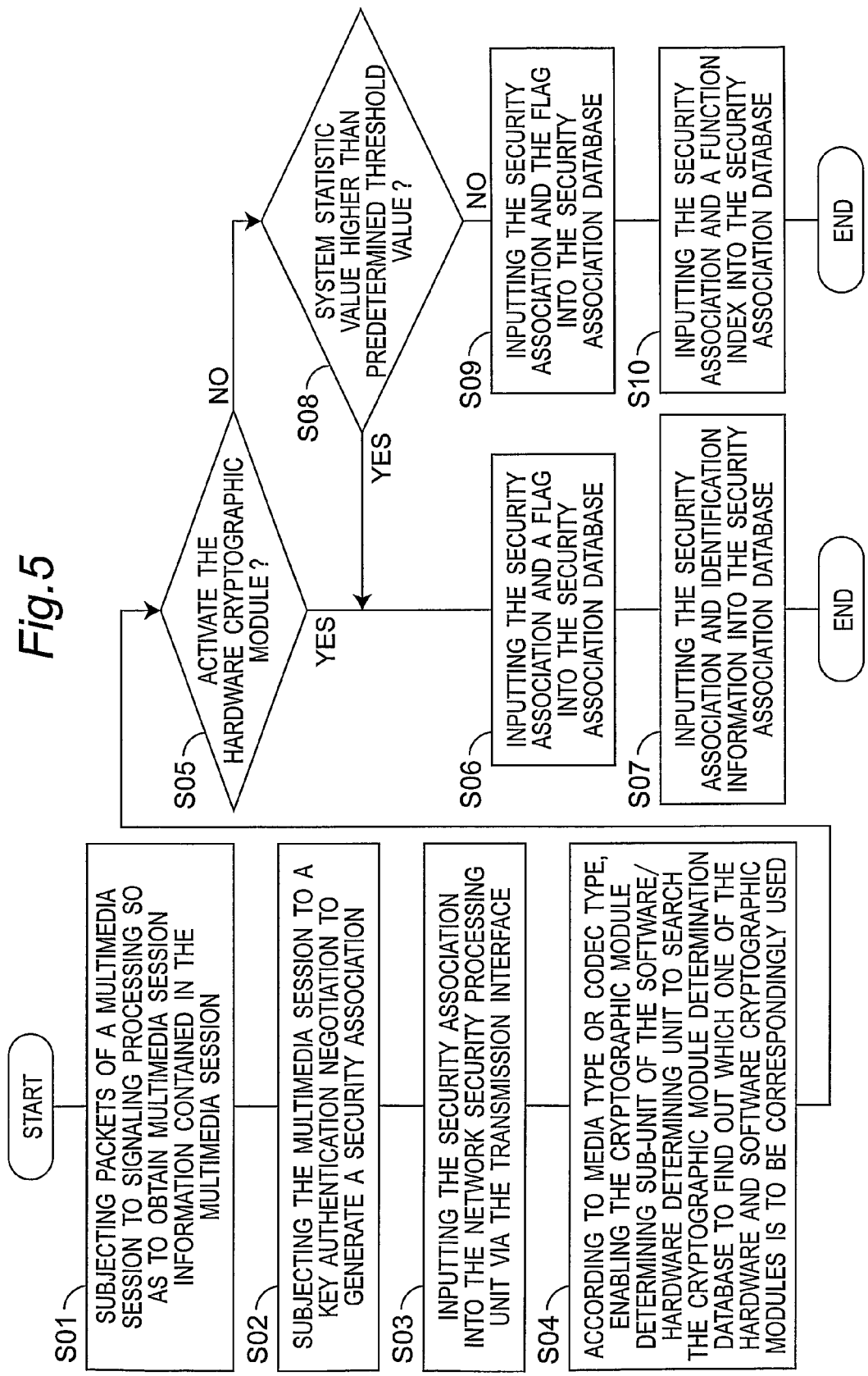
FIG. 5 is a flowchart to illustrate the process of generating a security association according to the first preferred embodiment.

The method executed by the first preferred embodiment of a system for selecting one of software and hardware cryptographic modules by means of multimedia session information according to the present invention includes the following steps:

Referring to FIGS. 1, 2 and 5, initially, in step S01, a plurality of packets of a multimedia session are subjected to signaling processing, and associated multimedia session information contained in the multimedia session is obtained. The multimedia session information includes a media type and a codec type.

Subsequently, in step S02, the multimedia session is subjected to a key authentication negotiation. In the first preferred embodiment, the key authentication negotiation uses Internet key exchange. The key authentication negotiation will generate a security association corresponding to the multimedia session.

Thereafter, in step S03, the generated security association is inputted into the network security processing unit 12 via the transmission interface 16.

Afterwards, in step S04, according to the media type or the codec type, the cryptographic module determining sub-unit 131 of the software/hardware determining unit 13 searches the cryptographic module determination database 132 to find out which one of the hardware cryptographic module 1221 and the software cryptographic module 1222 is to be correspondingly used.

Next, in step S05, after searching the cryptographic module determination database 132 according to the media type or codec type of the multimedia session information, a determination is made as to whether the hardware cryptographic module 1221 is to be activated. If the hardware cryptographic module 1221 is to be activated, in steps S06 and S07, a connection relationship between the flag and the identification information of the hardware cryptographic module 1221 and the security association is established. Moreover, like the contents of the security association database 126 of the network security processing unit 12 as shown in FIG. 3, the security association, the flag, and the identification information are respectively stored in sequence in the information fields 1271 of the matched key arrays 127 of the security association database 126. In this way, the assignment of the hardware cryptographic module 1221 for performing encryption and decryption on the multimedia session is completed.

In step S05, if the software cryptographic module 1222 is to be activated, it is required to first inspect whether the system statistic value is higher than the predetermined threshold value as in step S08. If yes, the network security processing of the packets of the multimedia session is executed by the hardware cryptographic module 1221, so as to reduce computational load. Otherwise, in steps S09 and S10, a connection relationship between the flag and the function index corresponding to the software cryptographic module 1222 and the security association is established. Moreover, like the contents of the security association database 126 of the network security processing unit 12 as shown in FIG. 3, the security association, the flag, and the function index are respectively stored in sequence in the information fields 1271 of the matched key arrays 127 of the security association database 126. In this way, the assignment of the software cryptographic module 1222 for performing encryption and decryption on the multimedia session is completed.

Figure 6:
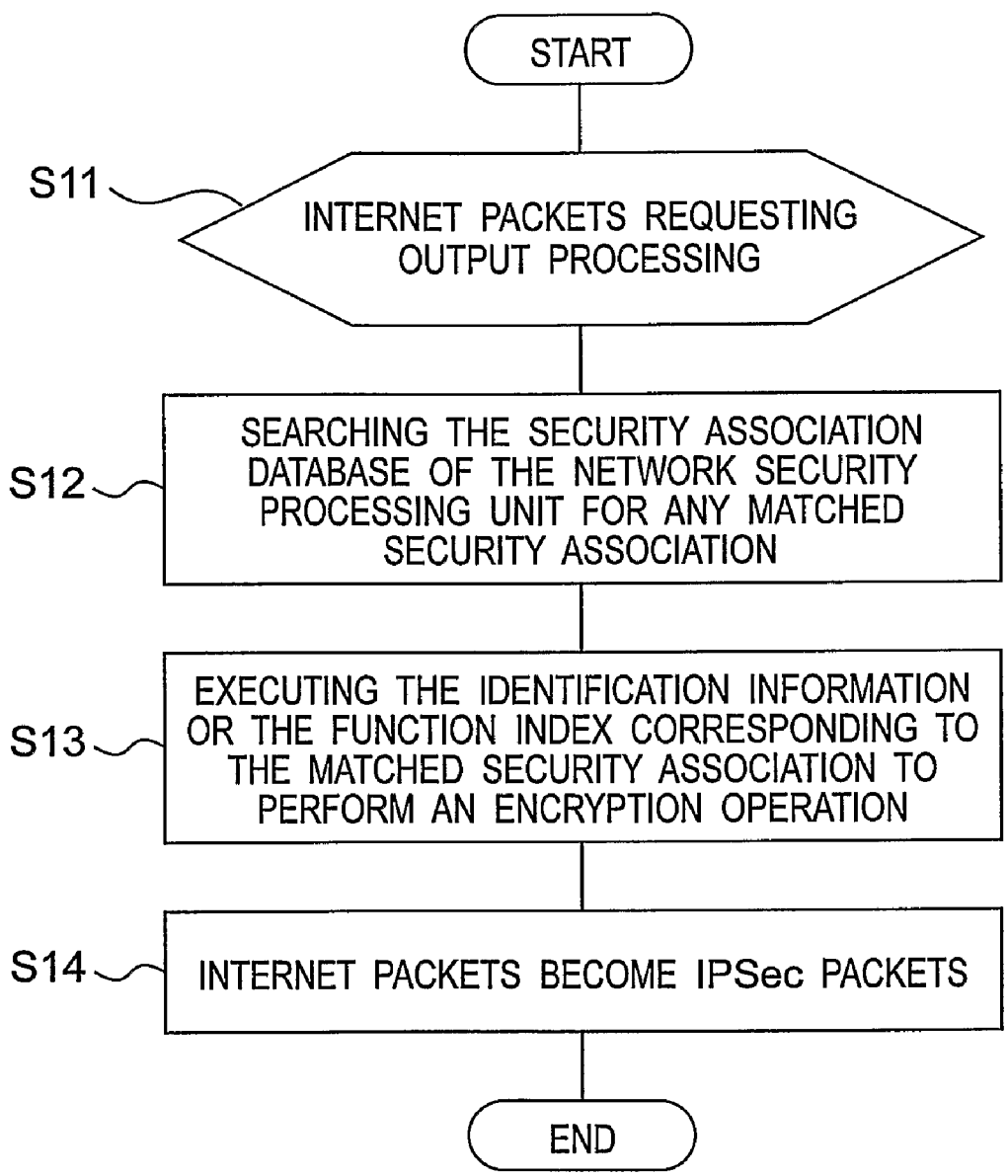
FIG. 6 is a flowchart to illustrate how a plurality of Internet packets are converted to a plurality of IPSec packets according to the first preferred embodiment.

Referring to FIG. 6, when there is an Internet packet output that needs to be encrypted into an IPSec packet, a device incorporating the first preferred embodiment of the present invention will adopt the following steps:

Initially, in step S11, a plurality of Internet packets request output processing. Next, in step S12, the security association database 126 of the network security processing unit 12 is searched for any matched security association. Then, in step S13, the identification information (when the hardware cryptographic module 1221 is used) or the function index (when the software cryptographic module 1222 is used) corresponding to the matched security association is utilized to perform an encryption operation. Finally, in step S14, the Internet packets become IPSec packets.

Figure 7:
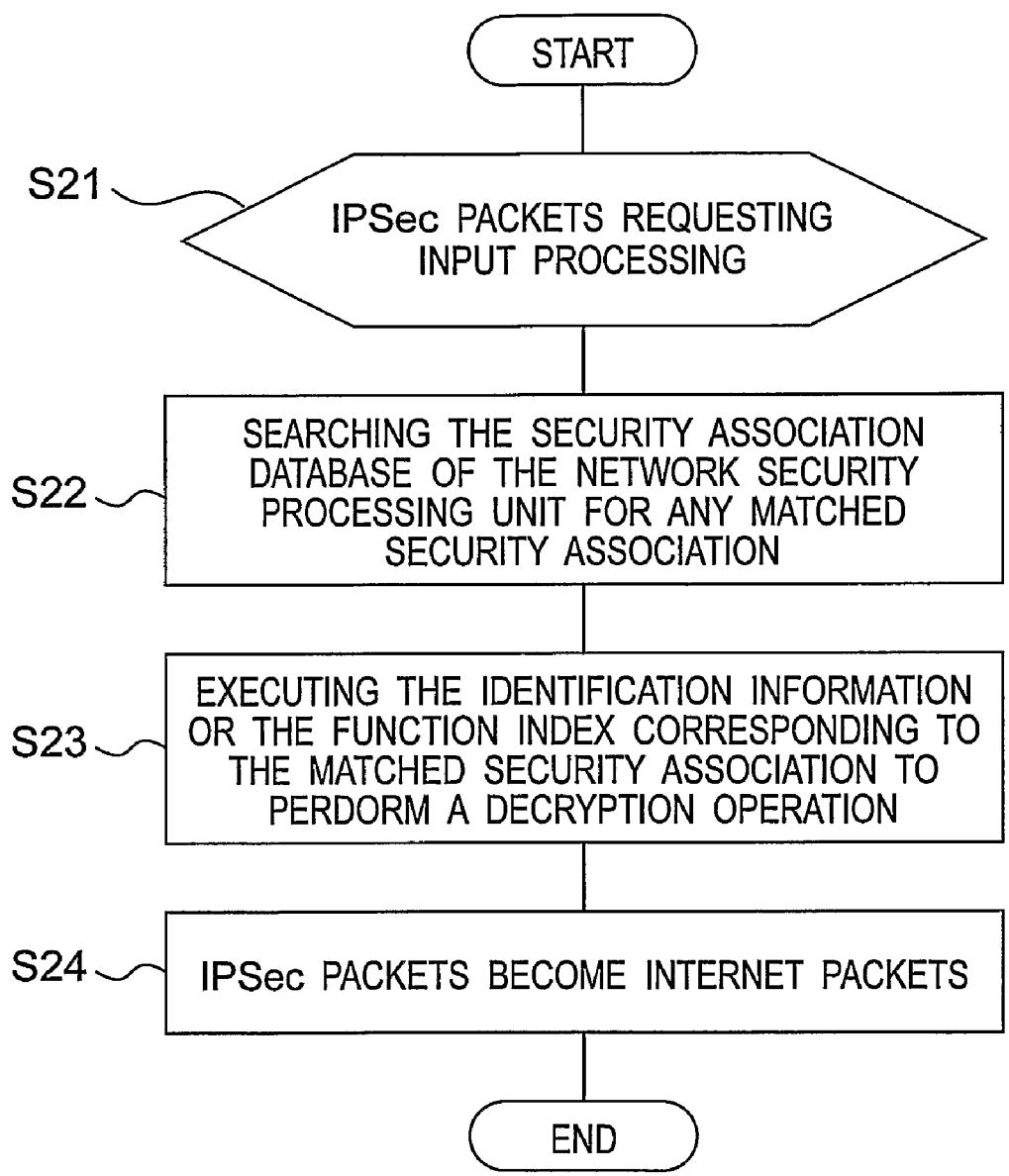
FIG. 7 is a flowchart to illustrate how IPSec packets are converted to Internet packets in the first preferred embodiment.

Referring to FIG. 7, when there is an IPSec packet input that needs to be decrypted into an Internet packet, a device incorporating the first preferred embodiment of the present invention will adopt the following steps:

Initially, in step S21, a plurality of IPSec packets request input processing. Next, in step S22, the security association database 126 of the network security processing unit 12 is searched for any matched security association. Then, in step S23, the identification information or the function index corresponding to the matched security association is utilized to perform a decryption operation. Finally, in step S24, the IPSec packets become Internet packets.

Figure 8:
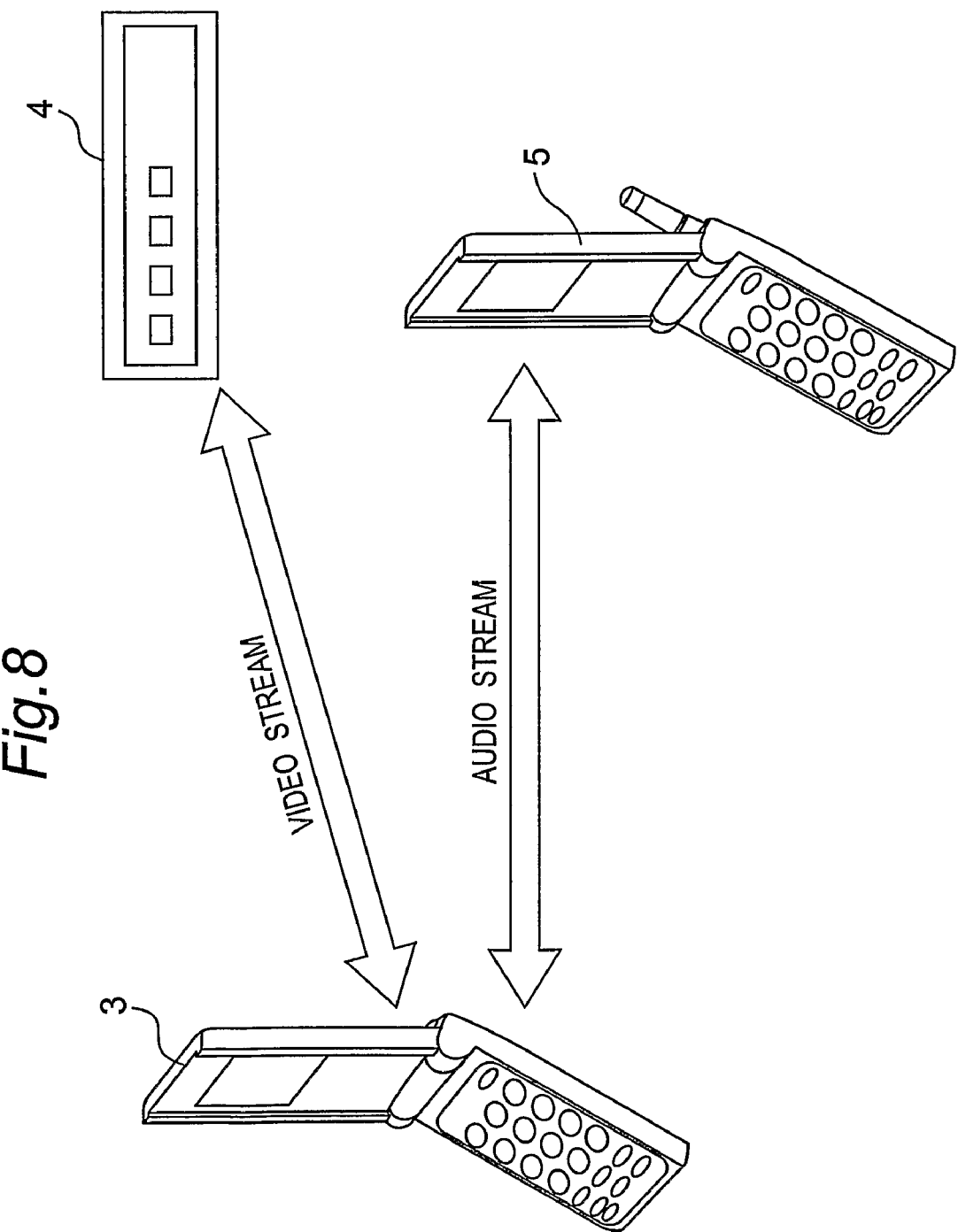
FIG. 8 is a schematic application diagram to illustrate encrypted transmission between a plurality of cell phones and a network media server according to the first preferred embodiment.

Referring to FIG. 8, in daily-life applications, transmitting multimedia contents in an encrypted form can ensure security during the transmission process. In addition, video and audio contents can be transmitted in real time by the adoption of the method disclosed in the present invention. In a communication application example of the first preferred embodiment according to the present invention, a first cell phone 3 can conduct transmission of a video stream with a network media server 4. The first cell phone 3 can also conduct transmission of an audio stream with a second cell phone 5.

Figure 9:
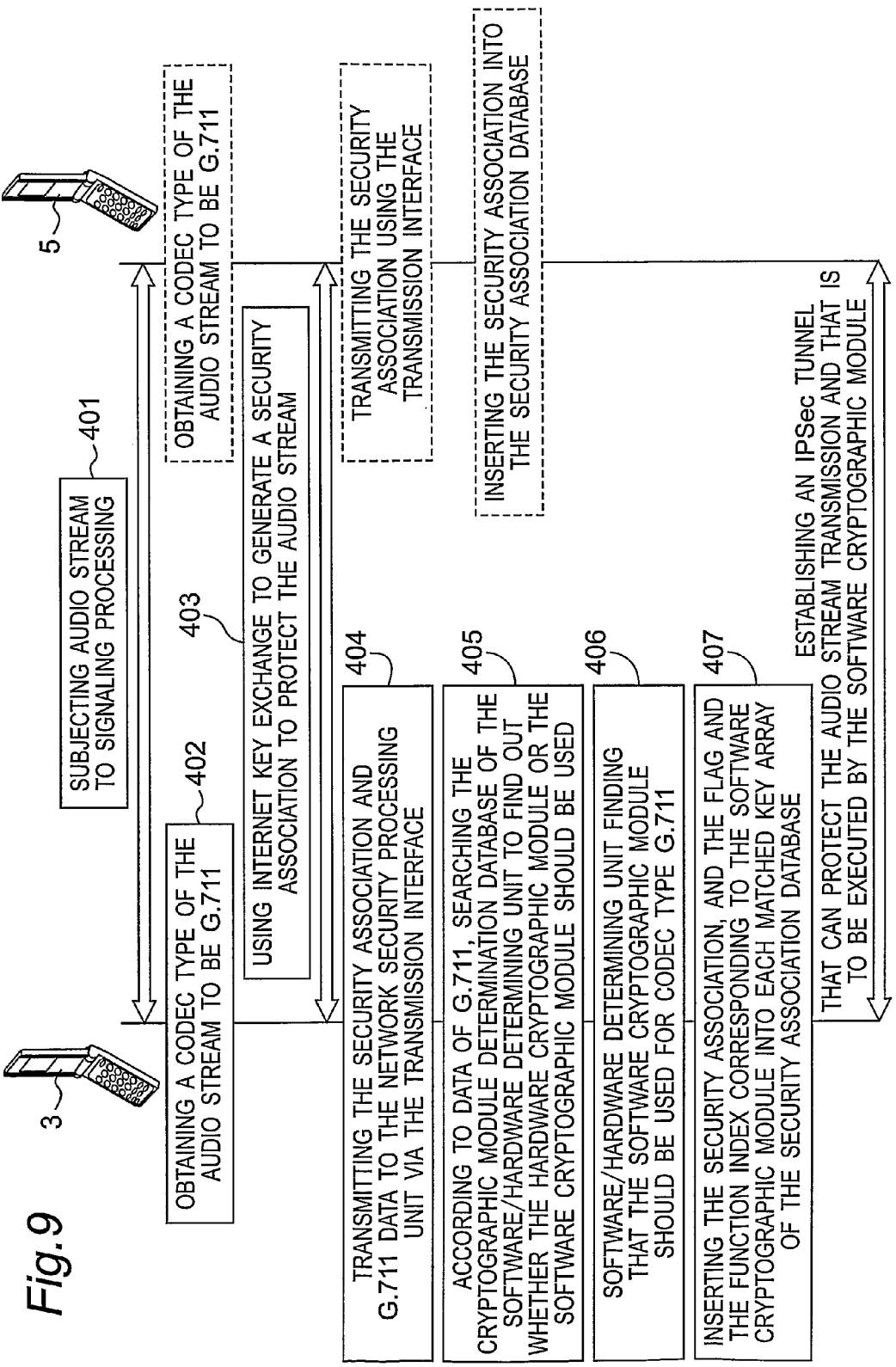
FIG. 9 is a schematic network communication diagram to illustrate an IPSec tunnel established between a first cell phone and a second cell phone according to the first preferred embodiment.

Referring to FIGS. 2, 8, and 9, when the first cell phone 3 and the second cell phone 5 conduct transmission of the audio stream, first, in step 401, the audio stream is subjected to signaling processing. Then, in step 402, the first cell phone 3 obtains a codec type of the audio stream, which is G.711 in this application example of the first preferred embodiment. Next, in step 403, Internet key exchange is used to generate a security association to protect the audio stream. Thereafter, in step 404, the transmission interface 16 is used to transmit the security association, information of G.711, etc., to the network security processing unit 12. Subsequently, in step 405, according to data of G.711, the cryptographic module determination database 132 of the software/hardware determining unit 13 is searched to find out whether the hardware cryptographic module 1221 or the software cryptographic module 1221 should be used. Then, in step 406, the software/hardware determining unit 13 finds that the software cryptographic module 1222 should be used for the codec type G.711. Then, in step 407, the security association, and the flag and the function index corresponding to the software cryptographic module 1222 are inserted into each matched key array 127 of the security association database 126 of the network security processing unit 12. Through the aforesaid steps, an IPSec tunnel that can protect the audio stream transmission and that is to be executed by the software cryptographic module 1222 can be set up.

Figure 10:
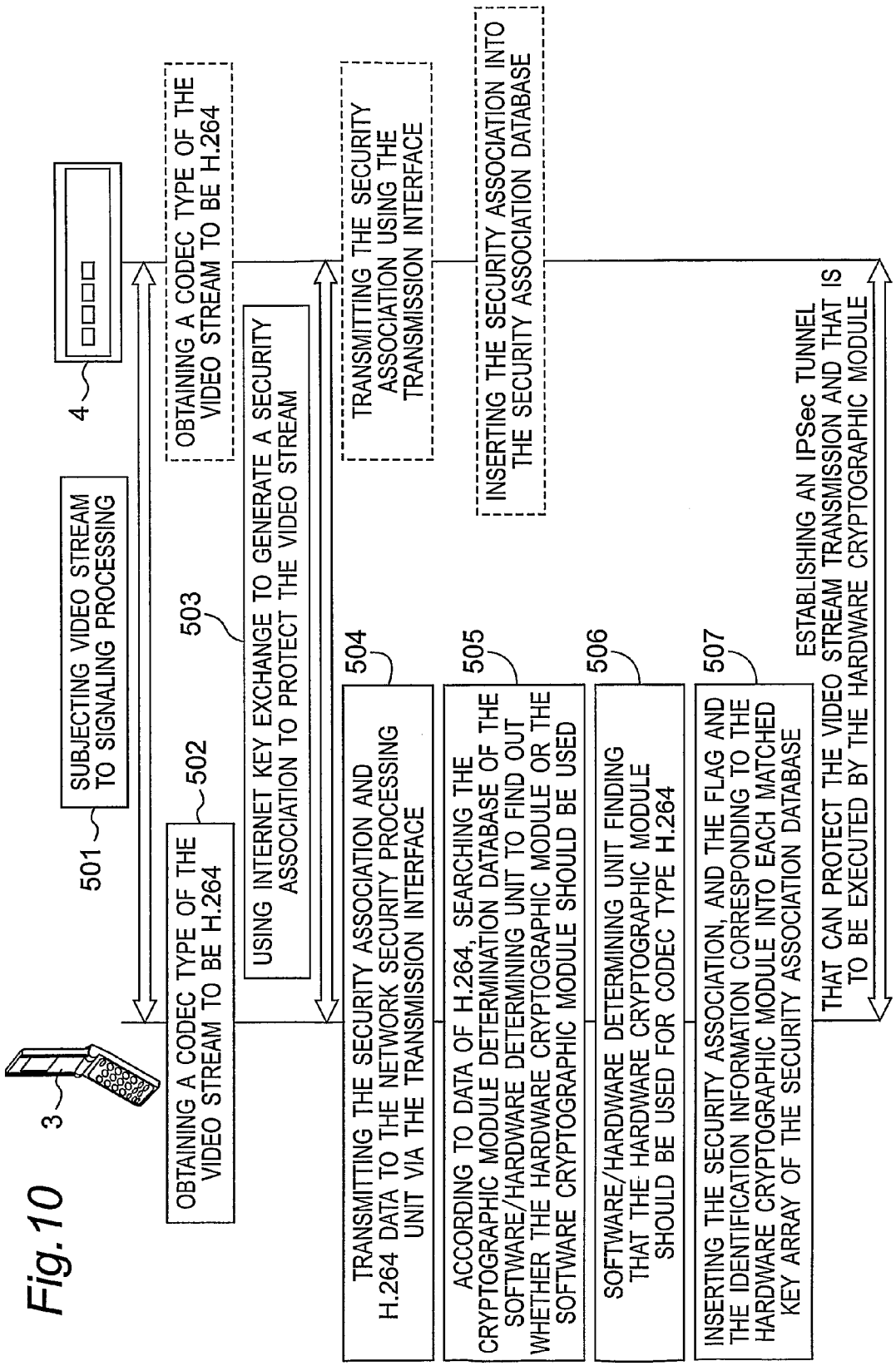
FIG. 10 is a schematic network communication diagram to illustrate an IPSec tunnel established between the first cell phone and the network media server according to the first preferred embodiment.

Referring to FIGS. 2, 8 and 10, when the first cell phone 3 and the network media server 4 conduct transmission of the video stream, initially, in step 501, the video stream is subjected to signaling processing. Next, in step 502, the first cell phone 3 obtains a codec type of the video stream, which is H.264 in this application example of the first preferred embodiment. Then, in step 503, Internet key exchange is used to generate a security association to protect the video stream. Subsequently, in step 504, the transmission interface 16 is used to transmit the security association, information of H.264, etc., to the network security processing unit 12. Subsequently, in step 505, according to data of H.264, the cryptographic module determination database 132 of the software/hardware determining unit 13 is searched to find out whether the hardware cryptographic module 1221 or the software cryptographic module 1222 should be correspondingly used. Thereafter, in step 506, the software/hardware determining unit 13 determines that the hardware cryptographic module 1221 is to be used. Next, in step 507, the security association, and the flag and the identification information corresponding to the hardware cryptographic module 1221 are inserted into each matched key array 127 of the security association database 126. By way of the aforesaid steps, an IPSec tunnel that can protect the video stream transmission and that is to be executed by the hardware cryptographic module 1221 can be set up.

Figure 11:
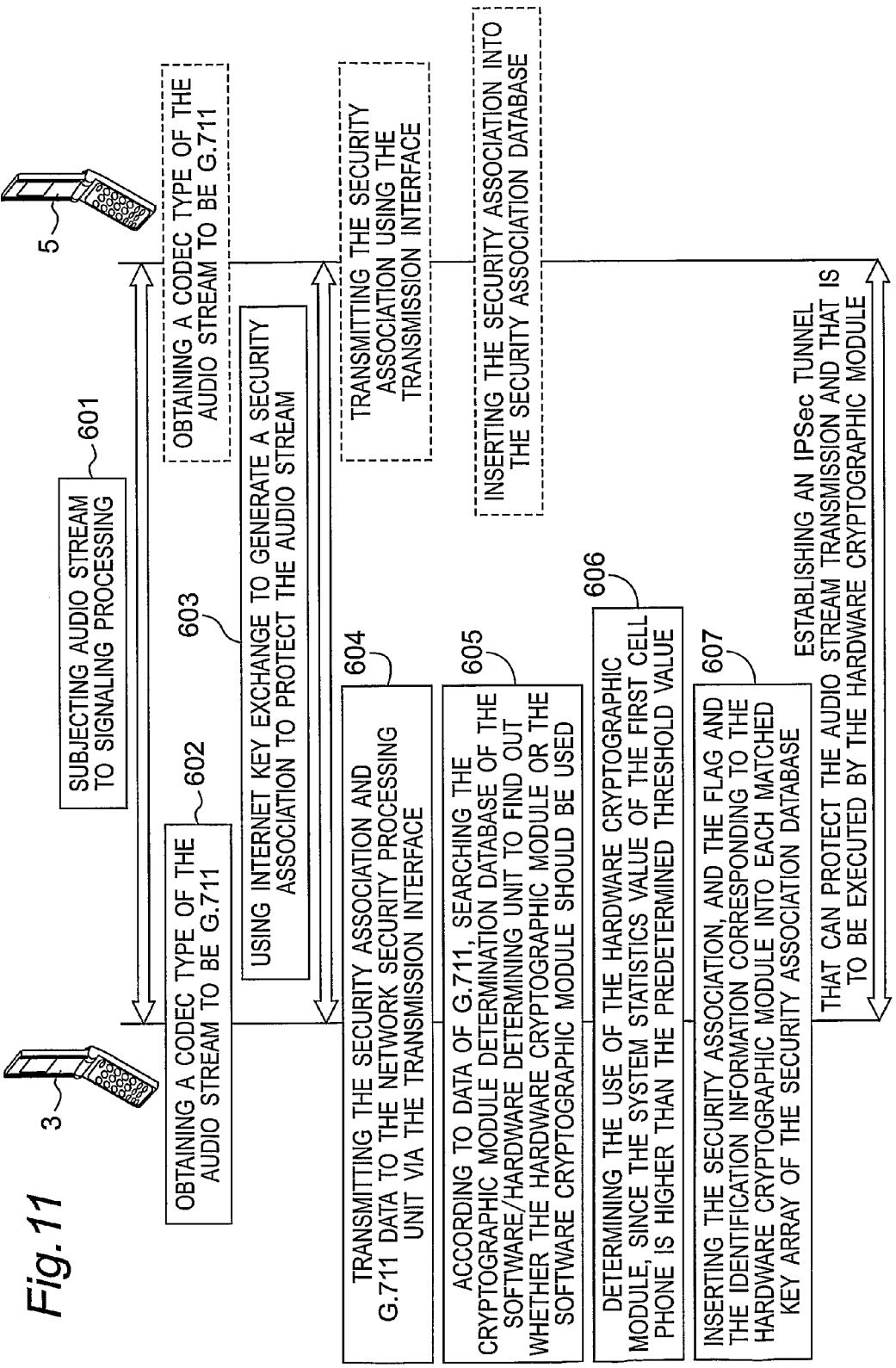
FIG. 11 is a schematic network communication diagram to illustrate an IPSec tunnel established between the first cell phone, which is in a high system load condition, and the second cell phone according to the first preferred embodiment.

Referring to FIGS. 2, 8 and 11, when the first cell phone 3 and the second cell phone 5 conduct transmission of the audio stream, initially, in step 601, the audio stream is subjected to signaling processing. Next, in step 602, the first cell phone 3 obtains the codec type of the audio stream, which is G.711 in this application example of the first preferred embodiment. Then, in step 603, Internet key exchange is used to generate the security association to protect the audio stream. Subsequently, in step 604, the transmission interface 16 is used to transmit the security association, information of G.711, etc., to the network security processing unit 12. Thereafter, in step 605, according to the data of G.711, the cryptographic module determination database 132 of the software/hardware determining unit 13 is searched to find out whether the hardware cryptographic module 1221 or the software cryptographic module 1222 is to be correspondingly used. Next, in step 606, since the system statistic value of the first cell phone 3 is higher than the predetermined threshold value, the cryptographic module determining sub-unit 131 of the software/hardware determining unit 13 determines the use of the hardware cryptographic module 1221. Then, in step 607, the security association, and the flag and the identification information corresponding to the hardware cryptographic module 1221 are inserted into each matched key array 127 of the security association database 126. After the aforesaid steps, an IPSec tunnel that can protect the audio stream transmission and that is to be executed by the hardware cryptographic module 1221 can be established.

Figure 12:
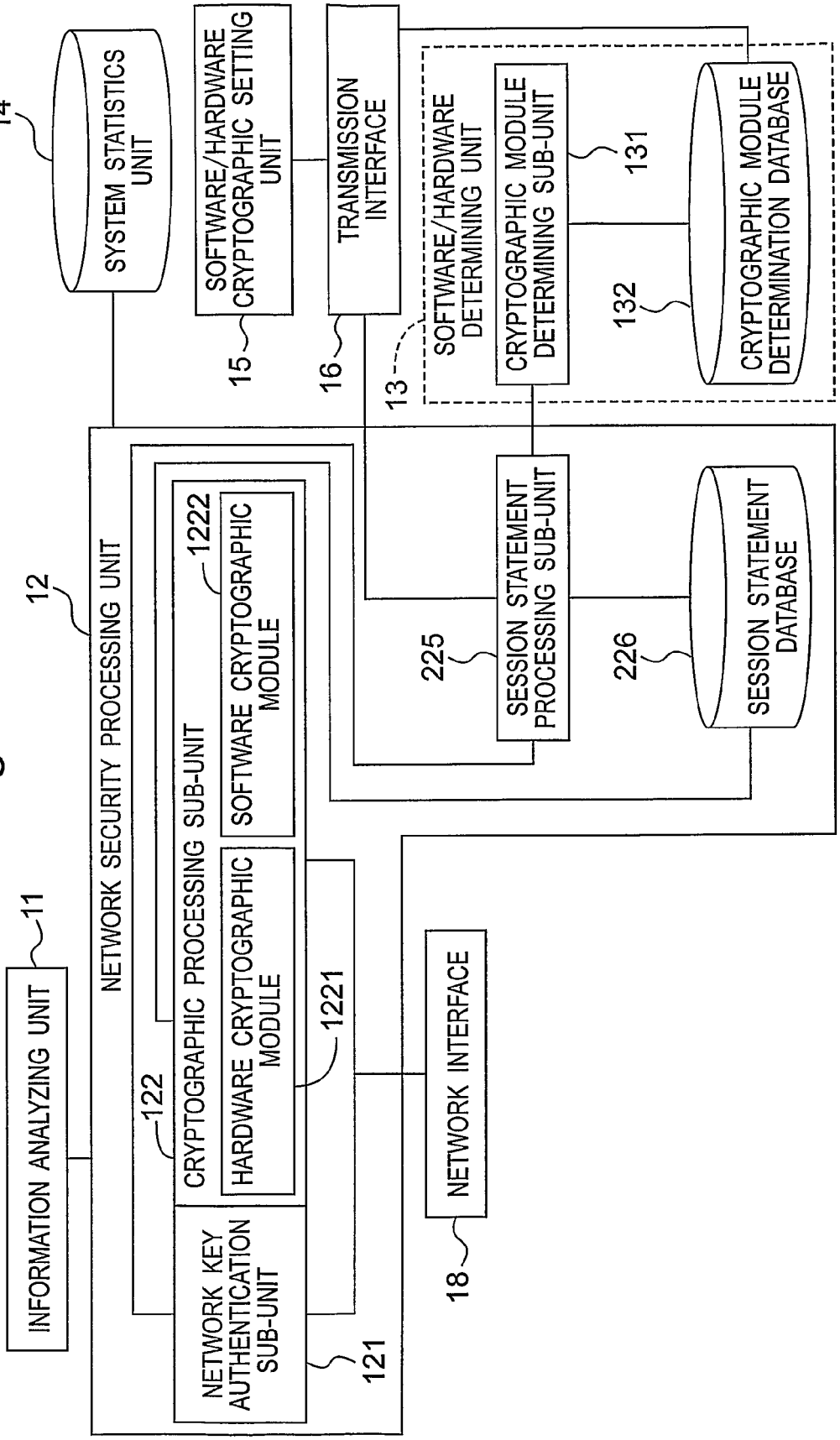
FIG. 12 is a system block diagram to illustrate the second preferred embodiment of a network security processing method and system for selecting one of software and hardware cryptographic modules by means of multimedia session information according to the present invention.

Referring to FIG. 12, the second preferred embodiment of a system for selecting one of software and hardware cryptographic modules by means of multimedia session information according to the present invention is also suitable for those adopting secure socket layer (SSL), transport layer security (TLS), or datagram transport layer security (DTLS) as encryption and decryption mechanism. The system of the second preferred embodiment is substantially the same as that of the first preferred embodiment, and includes: an information analyzing unit 11, a network security processing unit 12, a software/hardware determining unit 13, a system statistics unit 14, a software/hardware cryptographic setting unit 15, a transmission interface 16, and a network interface 18. However, the networking mechanism of the second preferred embodiment is aimed at transport layer and is different from that of the first preferred embodiment, and thus the Internet stack unit 17 shown in FIG. 1 is not included therein.

Figure 13:
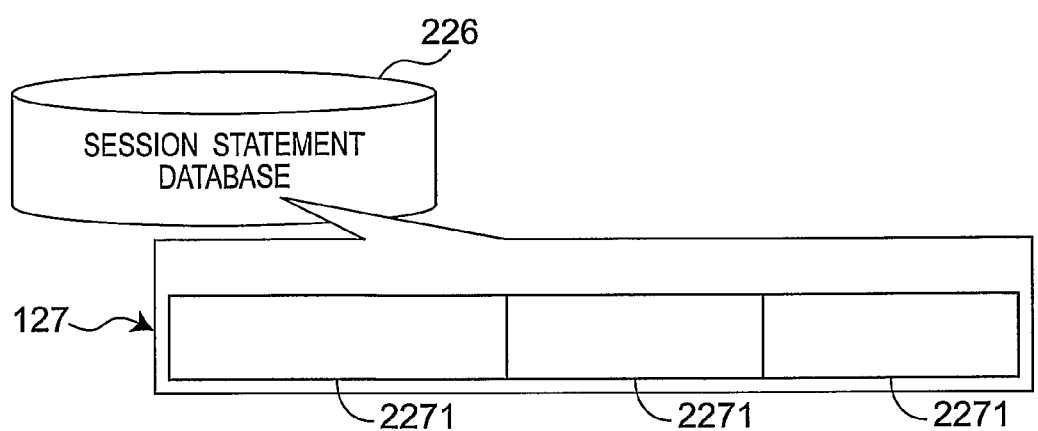
FIG. 13 is a schematic diagram to illustrate the contents of a session statement database of the second preferred embodiment.

The network security processing unit 12 includes a key authentication sub-unit 121 for conducting a key authentication negotiation with respect to the multimedia session, a cryptographic processing sub-unit 122 including a hardware cryptographic module 1221 and a software cryptographic module 1222, a session statement processing sub-unit 225, and a session statement database 226 connected to the session statement processing sub-unit 225. The session statement database 226 may also be implemented as a session statement data item for recording one entry of data. The cryptographic processing sub-unit 122 of the network security processing unit 12 uses the SSL to execute the network security processing. In addition, the key authentication sub-unit 121 of the network security processing unit 12 uses SSL handshake to generate a session statement. The session statement is generated at the two communicating parties to serve as a basis for encryption and decryption on both sides. Referring to FIG. 13, the session statement database 226 has a plurality of key arrays 127, where each key array 127 has a plurality of data fields 2271.

Since SSL is adopted, the network security processing unit 12 of this embodiment is slightly different from that of the first preferred embodiment, and the software/hardware determining unit 13 is also changed in some aspects. The software/hardware determining unit 13 is used to determine which one of the hardware cryptographic module 1221 and the software cryptographic module 1222 is to perform the network security processing based on the multimedia session information. The software/hardware determining unit 13 includes a cryptographic module determining sub-unit 131 for selecting the use of the hardware cryptographic module 1221 or the software cryptographic module 1222, and a cryptographic module determination database 132 connected to the cryptographic module determining sub-unit 131. If the software/hardware determining unit 13 determines the use of the hardware cryptographic module 1221, the session statement processing sub-unit 225 records the session statement, and a flag and identification information corresponding to the hardware cryptographic module 1221 in the data fields 2271 of each matched key array 127 of the session statement database 226. If the software/hardware determining unit 13 determines the use of the software cryptographic module 1222, the session statement processing sub-unit 225 records the session statement, and a flag and a function index corresponding to the software cryptographic module 1222 in the data fields 2271 of each matched key array 127 of the session statement database 226.

Reference is made to FIG. 14 in combination with FIG. 8, FIG. 14 showing how SSL is adopted for protection when the first cell phone 3 and the second cell phone 5 conduct transmission of the audio stream. Initially, in step 701, the audio stream is subjected to signaling processing. Then, in step 702, the first cell phone 3 obtains a codec type of the audio stream, which is G.711 in this application example of the second preferred embodiment. Next, in step 703, SSL handshake is used to generate the session statement to protect the audio stream. Then, in step 704, the transmission interface 16 is used to transmit the session statement, information of G.711, etc., to the network security processing unit 12. Subsequently, in step 705, according to the data of G.711, the cryptographic module determination database 132 of the software/hardware determining unit 13 is searched to find out whether the hardware cryptographic module 1221 or the software cryptographic module 1222 is to be correspondingly used. Then, in step 706, the cryptographic module determining sub-unit 131 of the software/hardware determining unit 13 finds that the software cryptographic module 1222 should be used. Finally, in step 707, the session statement, and the flag and the function index corresponding to the software cryptographic module 1222 are updated to the session statement database 226. An SSL tunnel that can protect transmission of the audio stream and that is to be executed by the software cryptographic module 1222 can be established by means of the aforesaid steps. In addition, transmission of video streams between the first cell phone 3 and the network media server 4 can be protected in a manner similar to that described hereinabove.

In sum, by using the multimedia session information to select hardware or software for performing encryption and decryption operations, the present invention can be effectively applied to environments requiring real-time transmission of encrypted video and audio streams, thereby positively achieving the effect of enhanced efficiency.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

INDUSTRIAL APPLICABILITY

The present invention can be applied to a network security processing method and system for selecting one of software and hardware cryptographic modules by means of multimedia session information.

The invention claimed is:

1. A network security processing method for selecting one of software and hardware cryptographic modules by means of multimedia session information, comprising:
    subjecting a plurality of packets of a multimedia session to signaling processing so as to obtain multimedia session information contained in the multimedia session, the multimedia session information including a media type and a codec type;
    subjecting the multimedia session to a key authentication negotiation; and
    according to the multimedia session information and a cryptographic module determination database, making a determination to activate one of the hardware cryptographic module and the software cryptographic module, the hardware cryptographic module managing network security processing of the packets of the multimedia session if the hardware cryptographic module is activated, the software cryptographic module managing network security processing of the packets of the multimedia session if the software cryptographic module is activated,
    wherein the cryptographic module determination database stores at least one of the media type and the codec type in association with one of a use of the hardware cryptographic module and a use of the software cryptographic module, and
    wherein the making a determination searches the cryptographic module determination database to determine the use of the hardware cryptographic module or the use of the software cryptographic module according to at least one of the media type and the codec type in the obtained multimedia session information.

2. The network security processing method according to claim 1, wherein, the determination is made based on the media type of the multimedia session information.

3. The network security processing method according to claim 1, wherein, the determination is made based on the codec type of the multimedia session information.

4. The network security processing method according to claim 1, wherein the making a determination includes that, if a system statistic value is higher than a threshold value, the hardware cryptographic module performs the network security processing of the packets of the multimedia session.

5. The network security processing method according to claim 4, wherein the system statistic value comprises a utilization rate of a central processing unit.

6. The network security processing method according to claim 4, wherein the system statistic value comprises a system load value.

7. The network security processing method according to claim 1, wherein, the key authentication negotiation generates a security association corresponding to the multimedia session.

8. The network security processing method according to claim 7, wherein the making a determination includes establishing a connection relationship between a flag and identification information corresponding to the hardware cryptographic module and the security association.

9. The network security processing method according to claim 7, wherein the making a determination includes establishing a connection relationship between a flag and a function index corresponding to the software cryptographic module and the security association.

10. The network security processing method according to claim 7, wherein said the network security processing comprises Internet protocol security.

11. The network security processing method according to claim 7, wherein the key authentication negotiation comprises Internet key exchange.

12. The network security processing method according to claim 1, wherein, the key authentication negotiation generates a session statement corresponding to the multimedia session.

13. The network security processing method according to claim 12, wherein the making a determination includes establishing a connection relationship between a flag and identification information corresponding to the hardware cryptographic module and the session statement.

14. The network security processing method according to claim 12, wherein the making a determination includes establishing a connection relationship between a flag and a function index corresponding to the software cryptographic module and the session statement association.

15. The network security processing method according to claim 12, wherein the network security processing comprises a secure socket layer.

16. The network security processing method according to claim 12, wherein the key authentication negotiation comprises a secure socket layer handshake.

17. The network security processing method according to claim 1, wherein the multimedia session information is obtained through a session initiation protocol.

18. The network security processing method according to claim 1, wherein the multimedia session information is obtained through a real-time streaming protocol.

19. A system for selecting one of software and hardware cryptographic modules by means of multimedia session information, comprising:
   an information analyzer configured to perform signaling processing of a multimedia session so as to obtain multimedia session information therein, the multimedia session information including a media type and a codec type;
   a network security processor configured to perform network security processing, said network security processor including a key authenticator configured to conduct a key authentication negotiation on the multimedia session, and a cryptographic processor containing said hardware cryptographic module and said software cryptographic module; and
   a software/hardware determiner configured to determine which one of said hardware cryptographic module and said software cryptographic module is to perform said network security processing based on the multimedia session information, said software/hardware determiner including a cryptographic module determiner configured to select the use of said hardware cryptographic module or said software cryptographic module, and a cryptographic module determination database connected to said cryptographic module determiner,
   wherein the cryptographic module determination database stores at least one of the media type and the codec type in association with one of the use of said hardware cryptographic module and the use of said software cryptographic module,
   wherein the software/hardware determiner searches the cryptographic module determination database to determine one of the use of said hardware cryptographic module and the use of said software cryptographic module according to at least one of the media type and the codec type obtained by said information analyzer.

20. The system according to claim 19, further comprising a system statistics processor configured to record a system statistic value, said software/hardware determiner selecting said hardware cryptographic module to perform the network security processing on the multimedia session when the system statistic value is higher than a threshold value.

21. The system according to claim 20, wherein the system statistic value comprises a utilization rate of a central processing unit.

22. The system according to claim 20, wherein the system statistic value comprises a system load value.

23. The system according to claim 19, further comprising a software/hardware cryptographic setter configured to connect said cryptographic module determination database of said software/hardware determiner, and to input into said cryptographic module determination database a plurality of preset conditions for selecting the use of said hardware cryptographic module or said software cryptographic module.

24. The system according to claim 19, wherein said key authenticator of said network security processor uses Internet key exchange to generate a security association.

25. The system according to claim 24, wherein said network security processor further includes a security association processor and a security association database connected to said security association processor, said security association database containing a plurality of key arrays, each of the key arrays containing a plurality of information fields.

26. The system according to claim 25, wherein, if said software/hardware determiner determines the use of said hardware cryptographic module, said security association processor records the security association, and a flag and identification information corresponding to said hardware cryptographic module in the information fields of each matched key arrays of said security association database.

27. The system according to claim 25, wherein, if said software/hardware determiner determines the use of said software cryptographic module, said security association processor records the security association, and a flag and a function index corresponding to said software cryptographic module in the information fields of each matched key array of said security association database.

28. The system according to claim 24, wherein said cryptographic processor of said network security processor uses Internet protocol security to perform the network security processing.

29. The system according to claim 19, wherein said key authenticator of said network security processor uses a secure socket layer handshake to generate a session statement.

30. The system according to claim 29, wherein said network security processor includes a session statement processor and a session statement database connected to said session statement processor, said session statement database containing a plurality of key arrays, each of the key arrays containing a plurality of data fields.

31. The system according to claim 30, wherein, if said software/hardware determiner determines the use of said hardware cryptographic module, said session statement processor records the session statement, and a flag and identification information corresponding to said hardware cryptographic module in the data fields of each matched key array of said session statement database.

32. The system according to claim 30, wherein, if said software/hardware determiner determines the use of said software cryptographic module, said session statement processor records the session statement, and a flag and a function index corresponding to said software cryptographic module in the data fields of each matched key array of said session statement database.

33. The system according to claim 29, wherein said cryptographic processor of said network security processor uses a secure socket layer to perform the network security processing.

34. The system according to claim 19, wherein said information analyzer comprises a session initiation protocol processor.

35. The system according to claim 19, wherein said information analyzer comprises a real-time streaming protocol processor.

36. The network security processing method according to claim 4,
   wherein the making a determination determines whether the system statistic value is higher than the threshold value, after the use of the software cryptographic module is determined from the cryptographic module determination database, and,
   wherein the hardware cryptographic module performs the network security processing of the packets of the multimedia session when the system statistic value is higher than the threshold value, even if the use of the software cryptographic modules is determined from the cryptographic module determination database.

37. The system according to claim 20,
wherein the software/hardware determiner determines whether the system statistic value is higher than the threshold value, after the use of the software cryptographic module is determined from the cryptographic module determination database, and,
wherein the software/hardware determiner selects said hardware cryptographic module, when the system statistic value is higher than the threshold value, even if the use of the software cryptographic modules is determined from the cryptographic module determination database.

38. The network security processing method according to claim 1, wherein the cryptographic module determination database stores the codec type in association with one of a use of the hardware cryptographic module and a use of the software cryptographic module.

39. The system according to claim 19, wherein the cryptographic module determination database stores the codec type in association with one of a use of the hardware cryptographic module and a use of the software cryptographic module.

* * * * *

UNITED STATES PATENT AND TRADEMARK OFFICE
CERTIFICATE OF CORRECTION

PATENT NO. : 8,266,422 B2  Page 1 of 1
APPLICATION NO. : 12/375772
DATED : September 11, 2012
INVENTOR(S) : H. Liu It is certified that error appears in the above-identified patent and that said Letters Patent is hereby corrected as shown below:

Title page (30) Foreign Application Priority Data, "Oct. 16, 2006 (CN)..... 2006 1 0135512" should read -- Oct. 16, 2006 (CN).... 2006 1 0135512.4 --.

At column 10, line 46 (claim 10, line 2) of the printed patent, "said" after wherein should be deleted.

Signed and Sealed this
Fifteenth Day of January, 2013

David J. Kappos
*Director of the United States Patent and Trademark Office*